US011552846B2

(12) United States Patent
Ghosh et al.

(10) Patent No.: US 11,552,846 B2
(45) Date of Patent: *Jan. 10, 2023

(54) ADAPTING DEMODULATION REFERENCE SIGNAL CONFIGURATION IN NETWORKS USING MASSIVE MIMO

(71) Applicant: AT&T Intellectual Property I, L.P., Atlanta, GA (US)

(72) Inventors: Arunabha Ghosh, Austin, TX (US); SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/103,014

(22) Filed: Nov. 24, 2020

(65) Prior Publication Data
US 2021/0083935 A1    Mar. 18, 2021

Related U.S. Application Data

(63) Continuation of application No. 16/513,629, filed on Jul. 16, 2019, now Pat. No. 10,880,164, which is a
(Continued)

(51) Int. Cl.
*H04L 5/00* (2006.01)
*H04L 41/0813* (2022.01)
(Continued)

(52) U.S. Cl.
CPC ....... *H04L 41/0813* (2013.01); *H04B 7/0413* (2013.01); *H04L 5/0023* (2013.01);
(Continued)

(58) Field of Classification Search
CPC . H04L 5/0023; H04L 5/0091; H04L 41/0813; H04L 41/0873; H04L 5/0048;
(Continued)

(56) References Cited

U.S. PATENT DOCUMENTS 8,750,257 B2   6/2014 Chung et al.
9,414,371 B2   8/2016 Pi et al.
(Continued)

FOREIGN PATENT DOCUMENTS

KR   10-2010-124677 A   11/2010
WO   2012/152004 A1     11/2012
(Continued)

OTHER PUBLICATIONS

Zaidi et al., "5G New Radio: Designing for The Future", Ericsson Technology Review, vol. 7, Jun. 27, 2017, pp. 1-14.
(Continued)

*Primary Examiner* — Chi Ho A Lee
(74) *Attorney, Agent, or Firm* — Amin, Turocy & Watson, LLP

(57) ABSTRACT

Based on the receipt of a demodulation reference signal from a user equipment, a determination can be made by the network node that a demodulation reference signal configuration is not suitable for the condition of a transmission link between the network node and the user equipment. In response to this determination, the demodulation reference signal configuration can be modified.

20 Claims, 13 Drawing Sheets

Related U.S. Application Data continuation of application No. 15/674,485, filed on Aug. 10, 2017, now Pat. No. 10,397,052.

(51) Int. Cl.

| | | |
|---|---|---|
| *H04L 25/02* | (2006.01) | |
| *H04W 76/27* | (2018.01) | |
| *H04B 7/0413* | (2017.01) | |
| *H04L 41/0873* | (2022.01) | |
| *H04W 88/02* | (2009.01) | |

(52) U.S. Cl.
CPC .......... *H04L 5/0048* (2013.01); *H04L 5/0091* (2013.01); *H04L 25/0224* (2013.01); *H04L 41/0873* (2013.01); *H04W 76/27* (2018.02); *H04L 5/001* (2013.01); *H04W 88/02* (2013.01)

(58) Field of Classification Search
CPC .... H04L 25/0224; H04L 5/001; H04W 76/27; H04W 88/02; H04B 7/0413
See application file for complete search history.

(56) References Cited

U.S. PATENT DOCUMENTS

| | | |
|---|---|---|
| 9,554,381 B2 | 1/2017 | Park et al. |
| 9,596,064 B2 | 3/2017 | Park et al. |
| 9,712,214 B2 | 7/2017 | Ding et al. |
| 2013/0329711 A1 | 12/2013 | Seo et al. |
| 2014/0133369 A1 | 5/2014 | Cheng et al. |
| 2014/0133395 A1 | 5/2014 | Nam et al. |
| 2014/0226541 A1 | 8/2014 | Xu et al. |
| 2014/0247749 A1 | 9/2014 | Kim et al. |
| 2014/0293881 A1 | 10/2014 | Khoshnevis et al. |
| 2015/0124673 A1* | 5/2015 | Ouchi ................. H04W 52/362 370/311 |
| 2015/0263796 A1 | 9/2015 | Nam et al. |
| 2015/0282123 A1 | 10/2015 | Miao et al. |
| 2015/0350977 A1 | 12/2015 | Xu et al. |
| 2015/0373694 A1 | 12/2015 | You et al. |
| 2016/0029238 A1 | 1/2016 | Chen et al. |
| 2016/0057753 A1 | 2/2016 | Yang et al. |
| 2016/0087709 A1 | 3/2016 | Horiuchi et al. |
| 2016/0112171 A1 | 4/2016 | Sorrentino et al. |
| 2016/0112994 A1 | 4/2016 | Wang et al. |
| 2016/0127094 A1 | 5/2016 | Jiang et al. |
| 2016/0127997 A1 | 5/2016 | Ang et al. |
| 2016/0192385 A1 | 6/2016 | Tooher et al. |
| 2016/0294526 A1 | 10/2016 | Kim et al. |
| 2016/0315748 A1 | 10/2016 | Chen et al. |
| 2016/0359600 A1 | 12/2016 | Krzymein et al. |
| 2017/0093538 A1 | 3/2017 | Yoon et al. |
| 2017/0180194 A1 | 6/2017 | Noh et al. |
| 2018/0035406 A1* | 2/2018 | Hao ..................... H04W 52/10 |
| 2018/0076866 A1* | 3/2018 | Chen .................... H04L 27/261 |
| 2018/0152899 A1* | 5/2018 | Jang .................... H04L 5/0048 |
| 2018/0212733 A1 | 7/2018 | Khoryaev et al. |
| 2018/0242347 A1 | 8/2018 | Sahlin et al. |
| 2018/0332619 A1* | 11/2018 | Manolakos ....... H04W 74/0825 |
| 2019/0052424 A1 | 2/2019 | Manolakos ......... H04W 52/281 |
| 2019/0182777 A1* | 6/2019 | Zhang .................. H04L 5/0044 |
| 2019/0357248 A1* | 11/2019 | Takeda .............. H04W 72/1284 |
| 2019/0373551 A1* | 12/2019 | Sundberg .............. H04L 5/0064 |
| 2020/0220583 A1* | 7/2020 | Cha ........................ H04W 80/08 |

FOREIGN PATENT DOCUMENTS

| | | |
|---|---|---|
| WO | 2014/155198 A2 | 10/2014 |
| WO | 2016/127939 A1 | 8/2016 |
| WO | 2017/107212 A1 | 6/2017 |
| WO | 2017/117424 A1 | 7/2017 |
| WO | 2017/131806 A1 | 8/2017 |
| WO | 2017/136079 A1 | 8/2017 |

OTHER PUBLICATIONS

"MIMO and Smart Antennas for Mobile Broadband Systems", 4G Americas™, 5Gamericas.org, Jun. 2013, pp. 1-42.
Non-Final Office Action received for U.S. Appl. No. 15/674,485 dated Nov. 28, 2018, 23 pages.
International Search Report and Written Opinion received for PCT Application Serial No. PCT/US2018/045491 dated Nov. 16, 2018, 16 pages.
International Preliminary Report on Patentability received for International Application Serial No. PCT/US2018/045491 dated Feb. 20, 2020, 11 pages.
Non-Final Office Action received for U.S. Appl. No. 16/513,629 dated May 22, 2020, 26 pages.
U.S. Appl. No. 16/513,629, filed Jul. 16, 2019.
U.S. Appl. No. 15/674,485, filed Aug. 10, 2017.

* cited by examiner

302
Symbols →

| Index | 0 | 1 | 2 | 3 | 4 | 5 | 6 |
|---|---|---|---|---|---|---|---|
| 11 | w(0), y(11) | w(1), y(11) | | | | w(2), y(11) | w(3), y(11) |
| 10 | w(0), y(10) | w(1), y(10) | | | | w(2), y(10) | w(3), y(10) |
| 9 | w(0), y(9) | w(1), y(9) | | | | w(2), y(9) | w(3), y(9) |
| 8 | w(0), y(8) | w(1), y(8) | | | | w(2), y(8) | w(3), y(8) |
| 7 | w(0), y(7) | w(1), y(7) | | | | w(2), y(7) | w(3), y(7) |
| 6 | w(0), y(6) | w(1), y(6) | DMRS | DMRS | DMRS | w(2), y(6) | w(3), y(6) |
| 5 | w(0), y(5) | w(1), y(5) | | | | w(2), y(5) | w(3), y(5) |
| 4 | w(0), y(4) | w(1), y(4) | | | | w(2), y(4) | w(3), y(4) |
| 3 | w(0), y(3) | w(1), y(3) | | | | w(2), y(3) | w(3), y(3) |
| 2 | w(0), y(2) | w(1), y(2) | | | | w(2), y(2) | w(3), y(2) |
| 1 | w(0), y(1) | w(1), y(1) | | | | w(2), y(1) | w(3), y(1) |
| 0 | w(0), y(0) | w(1), y(0) | | | | w(2), y(0) | w(3), y(0) |

Sub carrier ↑

304

PUCCH Format for LTE

FIG. 3

Schematics of a Multi-Antenna Receiver in UL

PUCCH Link BLER for Massive MIMO Receivers

ADAPTING DEMODULATION REFERENCE SIGNAL CONFIGURATION IN NETWORKS USING MASSIVE MIMO

RELATED APPLICATIONS

The subject patent application is a continuation of, and claims priority to each of, U.S. patent application Ser. No. 16/513,629 (now U.S. Pat. No. 10,880,164), filed Jul. 16, 2019, and entitled "ADAPTING DEMODULATION REFERENCE SIGNAL CONFIGURATION IN NETWORKS USING MASSIVE MIMO," which is a continuation of U.S. patent application Ser. No. 15/674,485 (now U.S. Pat. No. 10,397,052), filed Aug. 10, 2017, and entitled "ADAPTING DEMODULATION REFERENCE SIGNAL CONFIGURATION IN NETWORKS USING MASSIVE MIMO," the entireties of which applications are hereby incorporated by reference herein.

TECHNICAL FIELD

The present application relates generally to the field of wireless communication, and, more specifically, to adapting demodulation reference signal (DMRS) configuration for networks (including 5G or other next generation networks) employing massive multiple input multiple output (MIMO) techniques.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) and machine type communications (e.g., involving Internet of Things (IOT) devices).

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. MIMO techniques can improve mmWave communications, and has been widely recognized a potentially important component for access networks operating in higher frequencies. MIMO can be used for achieving diversity gain, spatial multiplexing gain and beamforming gain. For these reasons, MIMO systems, including massive MIMO systems using a large number of antennas, can be an important part of the 3rd and 4th generation wireless systems, and are planned for use in 5G systems.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 illustrates a chart showing the physical uplink control channel format for long term evolution (LTE) communications.

DETAILED DESCRIPTION

The following description and the annexed drawings set forth in detail certain illustrative aspects of the subject matter. However, these aspects are indicative of but a few of the various ways in which the principles of the subject matter can be implemented or employed. Other aspects, advantages, and novel features of the disclosed subject matter will become apparent from the following detailed description when considered in conjunction with the provided drawings. In the following description, for purposes of explanation, numerous specific details are set forth to provide an understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices (e.g., a user equipment (UE), a network node device, etc.) comprising programmable processors that execute machine executable instructions to facilitate performance of operations described herein. Examples of such devices can be devices comprising circuitry and components as described in FIG. 12 and FIG. 13.

The present patent application relates to reduced (or some might use the term simplified) physical layer communications procedures (reduced physical layer communications procedures) that can be implemented when a user equipment (UE) enters a battery power saving mode of operation. Example reduced physical layer procedures (also referred to as physical layer communications procedures) can be implemented based on reduced capabilities indicated by the UE. Example embodiments of reduced physical layer procedures can also be implemented based on the network node's reconfiguration of parameters to facilitate the activation of the reduced physical layer communications procedures, once the network node is notified by the UE that it is entering a battery saving mode. In example embodiments, the UE can also send to the network node recommendations of reduced physical layer procedures, which the network node can accept in whole or part, reject, or add to.

Figure 1:
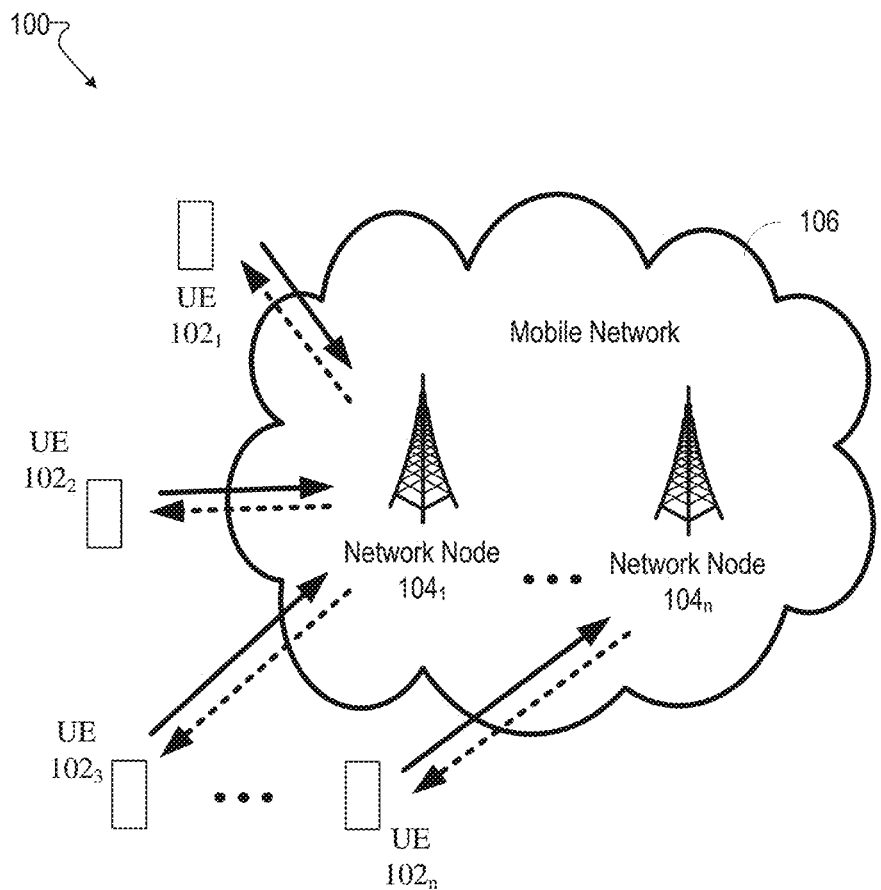
FIG. 1 illustrates an example wireless communication system which a network node device (e.g., network node) communicates with user equipment (UEs), or user devices, in accordance with various aspects and embodiments of the subject disclosure.

FIG. 1 illustrates an example mobile communication system 100 (also referred to as mobile system 100) in accordance with various aspects and embodiments of the subject disclosure. In example embodiments (also referred to as non-limiting embodiments), mobile system 100 can comprise a mobile (also referred to as cellular) network 106, which can comprise one or more mobile networks typically operated by communication service providers (e.g., mobile network 106). The mobile system 100 can also comprise one or more user equipment (UE) $102_{1-n}$ (also referred to as user devices). The UEs $102_{1-n}$ can communicate with one another via one or more network node devices (also referred to as network nodes) $1041_{1-n}$ (referred to as network node 104 in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile network 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers. For example, mobile system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU, described further below), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency —for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

Figure 2:
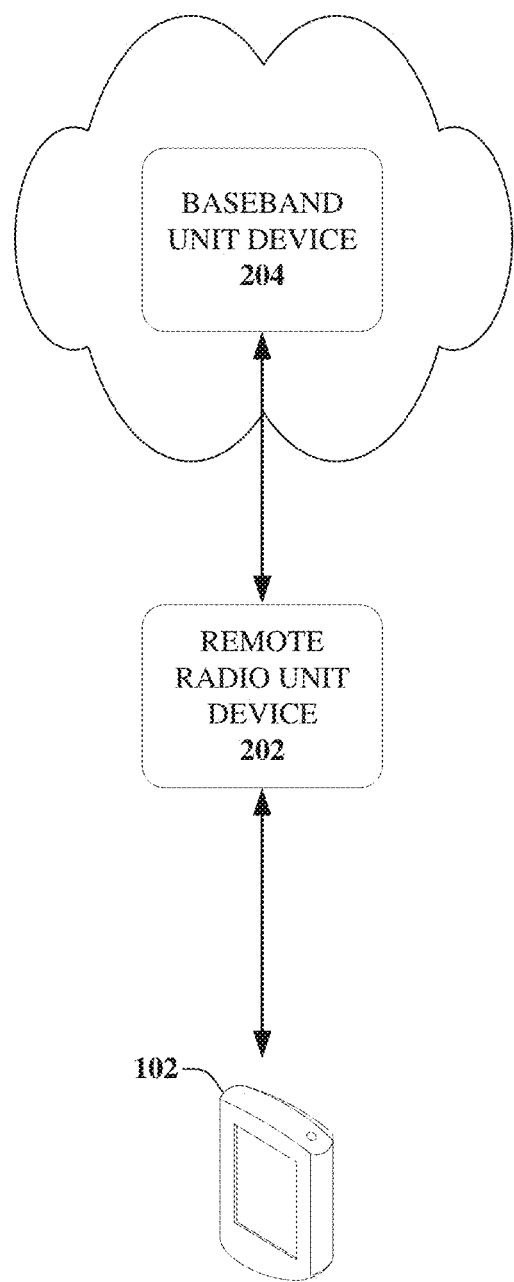
FIG. 2 illustrates a diagram showing a UE communicating with a remote radio unit (RRU) that is coupled to a baseband unit (BBU) device, in accordance with various aspects and embodiments of the subject disclosure.

Referring to FIG. 2, in one technique to meet increasing demand (and control costs), small cell deployments are being implemented with cloud radio access network (also referred to as Cloud-RAN, C-RAN, CRAN, centralized-RAN) systems, wherein a portion of a base station device (e.g., the baseband unit (BBU) device 204 of a node 104, e.g., a gNodeB) may support multiple remote radio unit (RRU) devices 202. In these example embodiments, the RRU devices 202 can be primarily used for transmission and reception of radio signals from UEs 102 (e.g., RF processing), while the BBU devices 204 can be used as the processing unit of telecom systems. BBU devices 204 can be of a smaller, modular design allowing for higher integration, lower power consumption and easier deployment. In a typical arrangement, a BBU device 204 can be placed in the equipment room and connected (also referred to as coupled) with the multiple RRUs 202 via communications links (e.g., optical fiber). In some embodiments, the RRUs 202 can be physically located at some distance from the BBUs. Thus, instead of deploying more network nodes having the full capabilities performed by the RRU and BBU, the network can thus have many RRUs coupled to a BBU.

Also, to aid in increasing capacity, the upcoming 5G access network may utilize higher frequencies (e.g., >6 GHz). Currently, much of the millimeter wave (mmWave) spectrum, the band of spectrum between 30 gigahertz (GHz) and 300 GHz is underutilized, offering the availability of large swaths of un-used spectrum. The millimeter waves have shorter wavelengths that range from 10 millimeters to 1 millimeter. While these new spectrum bands in higher frequency do hold the promise of more spectrum, and therefore the ability to meet the increasing demands of the mobile industry as stated above, the use of these higher frequency bands also come with some significant challenges and hurdles. One of the key issues is the poorer propagation that radio waves experience in these high frequency bands, as these mmWave signals can experience severe path loss, penetration loss, and fading.

It is known that the propagation loss depends on the frequency with a 20 log 10(F) dependency. This implies that for every 2× increase in the carrier frequency, there is a 6 dB increase in the propagation loss. With more adverse propagation conditions, it is usually the uplink (UL) that starts to become a challenge, since the total transmit power is limited at the mobile device (e.g., UE 102). Current mobile devices have a total of 23 dBm (200 mWatts) (wherein dBM is sometimes referred to as $dB_{mW}$ or decibel-milliwatts).

One of the key channels that needs to be preserved in the UL is the UL control channel, also referred to as Physical Uplink Control Channel (PUCCH). In example embodiments of a mobile network (e.g., network 106), the PUCCH control signaling comprises uplink data transmitted independently of traffic data. The PUCCH can carry various information, such as the hybrid automatic repeat request (HARQ) error control acknowledgement/negative acknowledgement (ACK/NACK) message related to the downlink (DL) transmission, channel state information (CSI) such as channel quality indicator (CQI), pre-coding matrix indicator (PMI), rank indicator (RI), CSI resource indicator (CRI), etc., and scheduling requests for uplink transmission. In example embodiments, the PUCCH can comprise one resource block (RB) per transmission at one end of the system bandwidth, followed by an RB in the following slot at the opposite end of the channel spectrum, thus making use of frequency diversity, with an estimated gain of 2 dB. A PUCCH control region comprises every two such RBs. Additionally, in PUCCH, a self-contained subframe enables a transmission and ACK/NACK in the same subframe. Without the PUCCH, which can be impacted by propagation losses, there is no way for the system to maintain any DL or UL data bearers (bearer channels can be assigned to UEs that are connected to the network, and a set of network parameters can define how the data carried on that channel is to be treated (e.g., best effort data, versus guaranteed), which is why the PUCCH is often designed to be robust).

Shown in FIG. 3 is a design of the PUCCH in LTE (e.g., the PUCCH format for LTE), wherein the columns correspond to OFDM symbols 302, and the rows correspond to sub carrier indices 304. A somewhat similar design for 5G NR can be expected as well, with minor changes. Referring to FIG. 3, OFDM symbols 2-4 carry the demodulation reference signal and can also carry data. The density of the DMRS (also referred to as the pilot density) refers to the amount of DMRS signaling carried in OFDM symbols 2-4 versus the amount of data carried in OFDM symbols 2-4. The DMRS is used for aiding the UL transmitter with performing channel estimation and noise variance estimation, both of which are conducive for the UL receiver to demodulate the signal.

With improved UL waveform design and improved power amplifier technology (power amplifier), it is expected that in 5G access networks, the power can be pushed to somewhere around 26-27 dBm (400-500 mWatts). However, this increase in power might not be enough to deal with the adversity of the propagation conditions in higher frequency bands.

Apart from higher power the mobile industry is also exploring other techniques, including those related to new physical layer design and advanced receiver designs to overcome the propagation hurdles in high frequency bands.

In one technique, performance can be improved with the use of multiple antennas. The shorter wavelengths at mmWave frequencies allow for more antennas to be packed in the same physical dimension, which allows for large-scale spatial multiplexing and highly directional beamforming. Multi-antenna techniques can significantly increase the data rates and reliability of a wireless communication system. Multiple input multiple output (MIMO), which was introduced in the third-generation partnership project (3GPP) and has been in use since (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized as a potentially important component for access networks operating in higher frequencies. MIMO can be used for achieving diversity gain, spatial multiplexing gain and beamforming gain. For these reasons, MIMO systems can be expected to continue to be implemented in 5G systems.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 4:
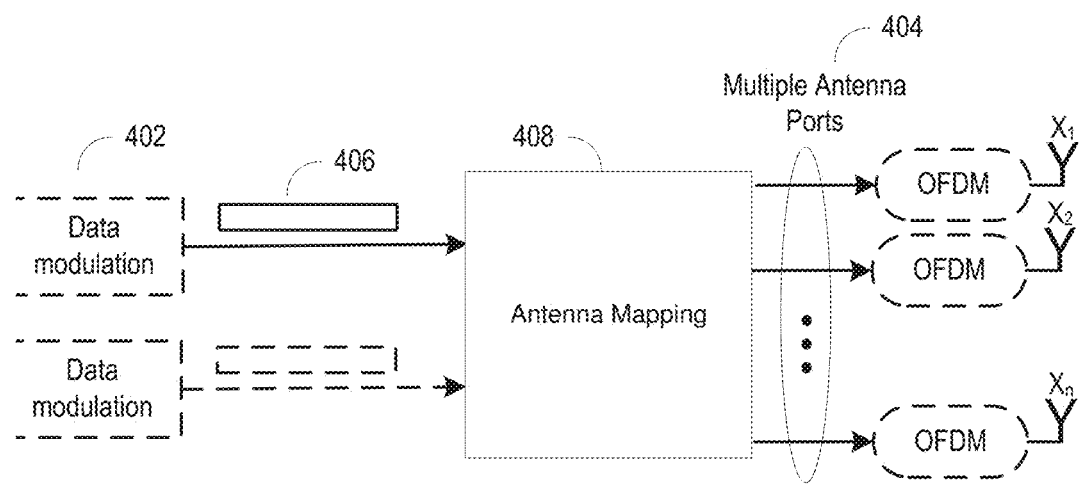
FIG. 4 illustrates an example of a multi-antenna transmission embodiment having multiple antenna ports, in accordance with various aspects and embodiments of the subject disclosure.

FIG. 4 illustrates an example of a multi-antenna transmission embodiment having multiple antenna ports. As mentioned above, arrangements with more antenna ports are expected to be used for 5G systems. Antenna mapping in general, can be described as a mapping from the output of the data modulation 402 to the different antenna ports 404. The input 406 to the antenna mapping component(s) 408 thus consists of the modulation symbols (QPSK, 16 QAM, 64 QAM, 256 QAM) corresponding to the one or two transport blocks. To be more specific, there is one transport block per transmission time interval (TTI), except for spatial multiplexing, in which case there may be up to two transport blocks per TTI. The output of the antenna mapping comprises a set of symbols for each antenna port. The symbols of each antenna port are subsequently applied to the OFDM modulator—that is, mapped to the basic OFDM time-frequency grid corresponding to that antenna port.

Systems incorporating a very large number of antennas (degrees of freedom) at the network node (e.g., network node 104), for example greater than 8×8 (8 transmit and 8 receive antennas), can be referred to as "massive MIMO" systems (also known as Large-Scale Antenna Systems, Very Large MIMO, Hyper MIMO, Full-Dimension MIMO and ARGOS), which are expected to be a differentiator between currently deployed LTE (4G) mobile networks and 5G mobile networks of the future. The large number of antennas can be used in the downlink (DL) for precoding and in the uplink (UL) for multi-antenna equalization.

Figure 5:
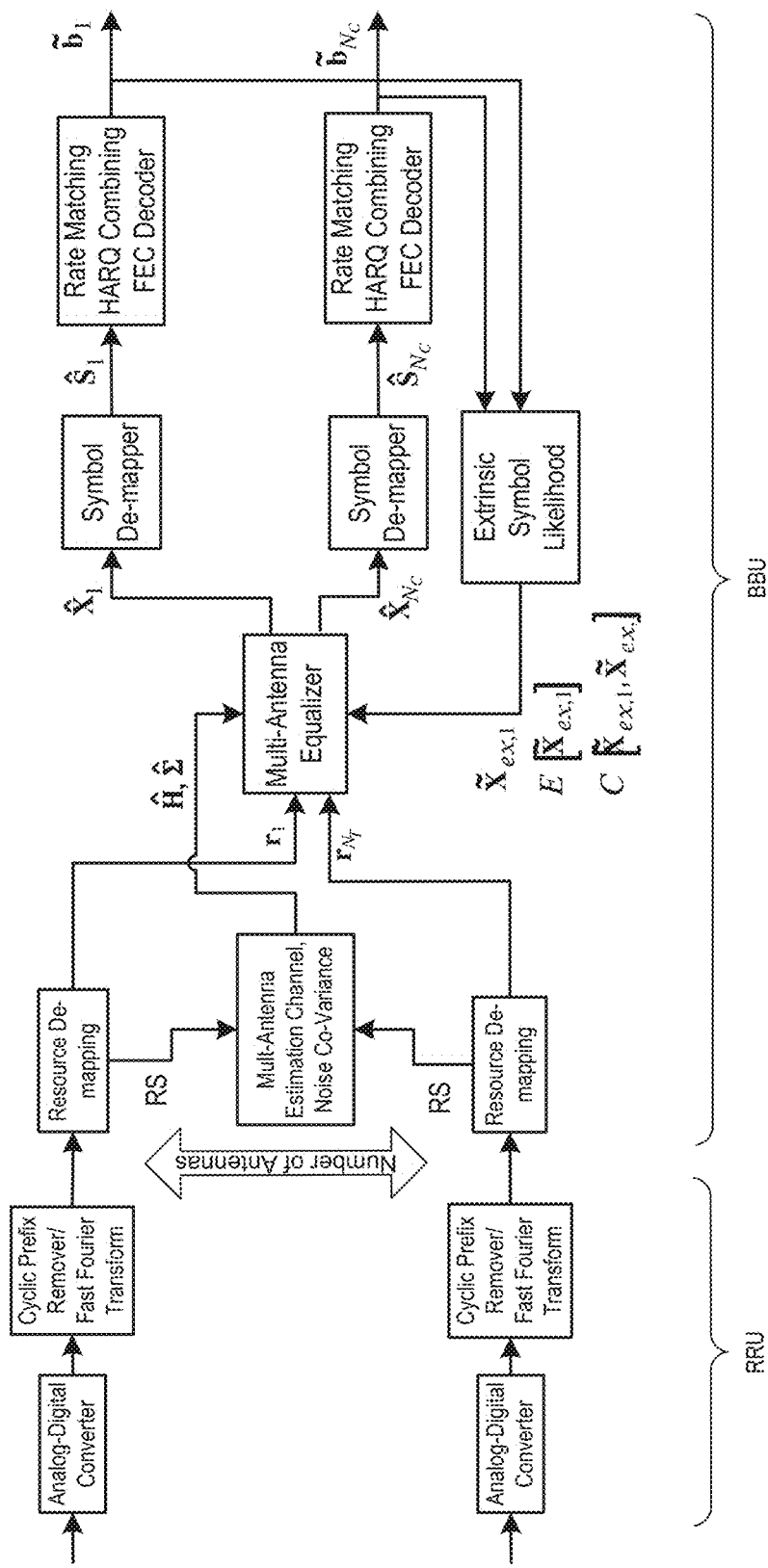
FIG. 5 illustrates an example of a schematics of a multi-antenna receiver in the UL (e.g., network node), in accordance with various aspects and embodiments of the subject disclosure.

FIG. 5 shows a schematic figure of an example multi-antenna receiver (e.g., network node 104 comprising an RRU device 202 and BBU device 204) that can be used in the UL. The network node (also referred to as the receiver, or UL receiver) in the present application) can benefit from a large number of receiver antennas (degrees of freedom) since it can be used for a variety of functions such as interference cancellation, coherent combining, beam steering, null steering etc. One practical implementation of massive MIMO uses individual antenna elements as a receiver path, thereby making active antenna systems an enabler of massive MIMO in upcoming 5G cellular networks.

With massive MIMO systems it is possible to increase the UL coverage to mitigate the propagation challenges associated with higher frequency bands, as mentioned above. However, as the system continues to operate at a lower signal-to-noise-plus-interference ratio (SINR) regime (as explained below, if more antennas are added, at some point, the SINR begins to fall), one of the problems faced by the UL receiver is in channel estimation. As shown in FIG. 5, the channel estimation stage occurs before the multi-antenna equalization stage, and therefore is done at the lower SINR, as the push for coverage extension continues.

Figure 6:
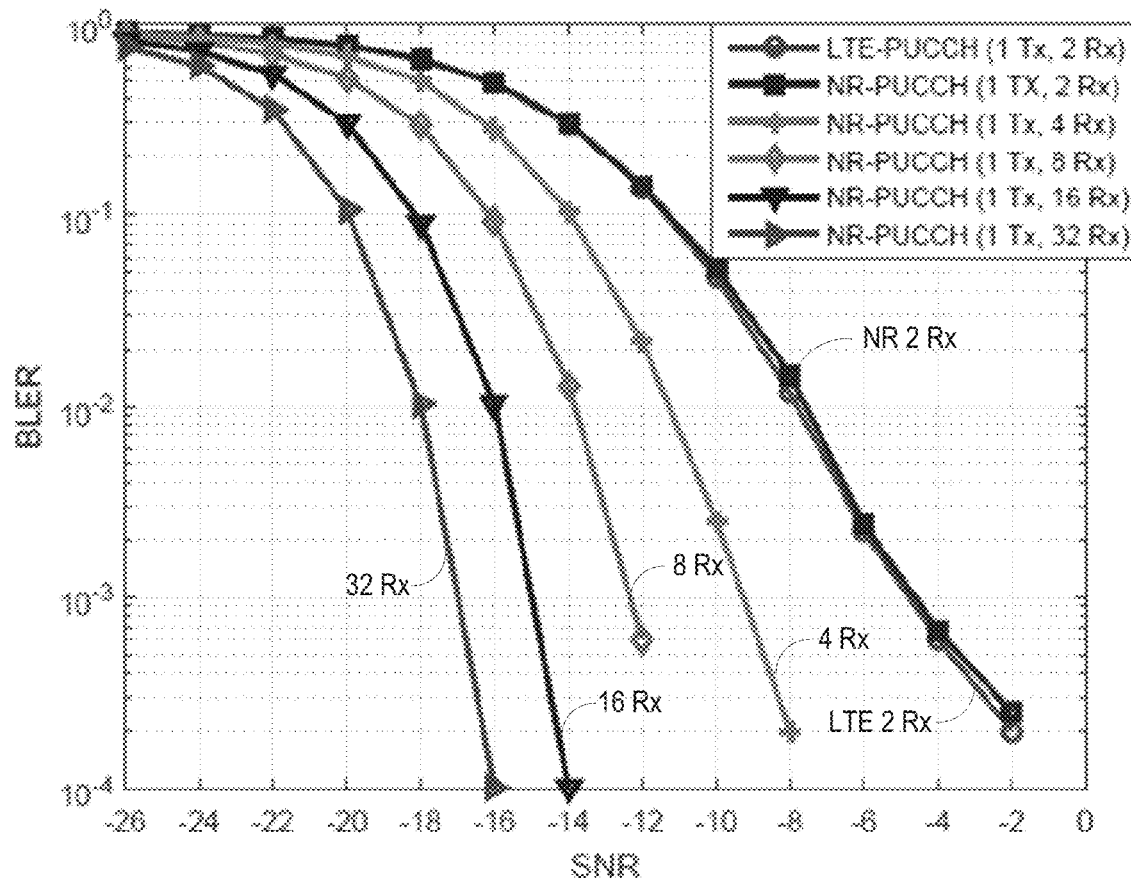
FIG. 6 illustrates a graph showing block error rate (BLER) versus signal-to-noise-plus-interference ratio (SINR), with curves representative of the number of multiple antennas.

FIG. 6 is a graph showing block error rate (BLER) versus SINR. As mentioned above, at low SINR, channel estimation can become a challenge. Referring to FIG. 6, looking at the curves, it can be noticed that as the number of antennas at the receiver increases, the SINR operating point of the UL receiver can decrease. For a typical example mobile network, the operating point can be defined as 1% BLER.

Theoretically as the number of antennas at the receiver doubles, a gain >3 dB can be expected. This is because at least a 3 dB array can be expected to combine gains, and some additional gain can come from diversity gain. The diversity gain comes from the fact that the signal fading at the different antennas is somewhat un-correlated. Therefore, even with completely correlated fading between antennas, a 3 dB gain can be expected if the number of antennas is doubled.

If the typical operating point of PUCCH (i.e. 1% BLER) in FIG. 6 is considered, it can be seen that the gain is less than 3 dB when the number of antennas is doubled. The 3 dB trend is seen going from 2 antennas to 4 antennas, and from 4 antennas to 8 antennas. However, beyond 8 antennas we do not see the 3 dB gain as the SINR operating point falls below −12 dB. This happens because errors introduced during the channel estimation stage at the receiver becomes more prominent when the operating SINR point falls below −12 dB. This is a fundamental issue with the design of the current PUCCH channel, which doesn't allow it to operate at very low SINR, even though the large number of receiver antennas is capable of doing so barring the issues of channel estimation error.

In example embodiments in accordance with aspects of the present application, a technique (e.g., which can involve a system, method, etc.) for adapting a demodulation reference signal (DMRS) configuration, to aid the network node (e.g., the UL receiver) with the channel estimation stage, is described herein.

In the context of this disclosure, DMRS configuration refers to both the power as well as the density (as described above with reference to FIG. 3) of the DMRS. Since the impairment of signals at the UL receiver (e.g., network node) is only known by the UL receiver, this method includes a closed loop solution, where the DMRS configuration and its modification is indicated by the UL receiver to the transmitter (e.g., the UE). This system can adapt the power, the density, or a combination of both, to aid the channel estimation stage of the network node more optimally. The proposed method allows for the UL DMRS configuration to be adapted based on link condition, which allows for a robust performance of the UL control channel even at low SINR conditions. This allows the 5G system to operate in higher frequency bands while matching the coverage of legacy systems such as 4G LTE in lower frequency bands. Note that the techniques proposed in this disclosure are applicable to both downlink and uplink and side link data transmission schemes even though the example of UL is cited as a primary use case. In addition, the embodiments are applicable to single carrier and multi carrier (carrier aggregation) transmission schemes.

To introduce (or re-familiarize) the concepts of reference signal and closed loop, a closed loop spatial multiplexing scheme applicable to MIMO and massive MIMO systems that uses codebook-based precoding (wherein open loop systems do not require knowledge of the channel at the transmitter, while closed loop systems require channel knowledge at the transmitter, provided via a feedback channel by the UE), is briefly described. In this scheme, one or more reference signals RS (also referred to as a pilot signal, or pilot) are first sent from the network node (e.g., network node 104) to the UE (e.g., UE 102). The UE can evaluate the reference signals and compute the channel estimates and the parameters needed for channel state information (CSI) reporting. In LTE, the CSI report comprises, for example, the channel quality indicator (CQI), precoding matrix index (PMI), rank information (RI), CSI resource indicator (CRI), etc. (these parameters may be similar for a 5G network, but may carry a different name, or designation). The CSI report is sent to the network node via a feedback channel either on a periodic basis or on demand based CSI (e.g., aperiodic CSI reporting). The network node scheduler uses this information in choosing the parameters for scheduling of this particular UE. The network node sends the scheduling parameters to the UE on the downlink control channel called the physical downlink control channel (PDCCH). After that, actual data transfer takes place from the network node to the UE (e.g., on the physical downlink shared channel (PDSCH)).

In the technique that is the subject of the present application, the network node (also referred to as the receiver, or UL receiver in the present application) evaluates a reference signal sent by the user equipment (also referred to as the transmitter) in the present application. This technique relates to the signaling of the DMRS configuration from the receiver (e.g., network node 104) to the transmitter (e.g., UE 102), which sends a reference signal (e.g., DMRS) to the network node. Based on the evaluation of the reference signal, a determination can be made to modify the DMRS configuration. This technique can aid the channel estimation stage at channel at the network node. The DMRS configuration is thus adapted, based on the link conditions.

Figure 7:
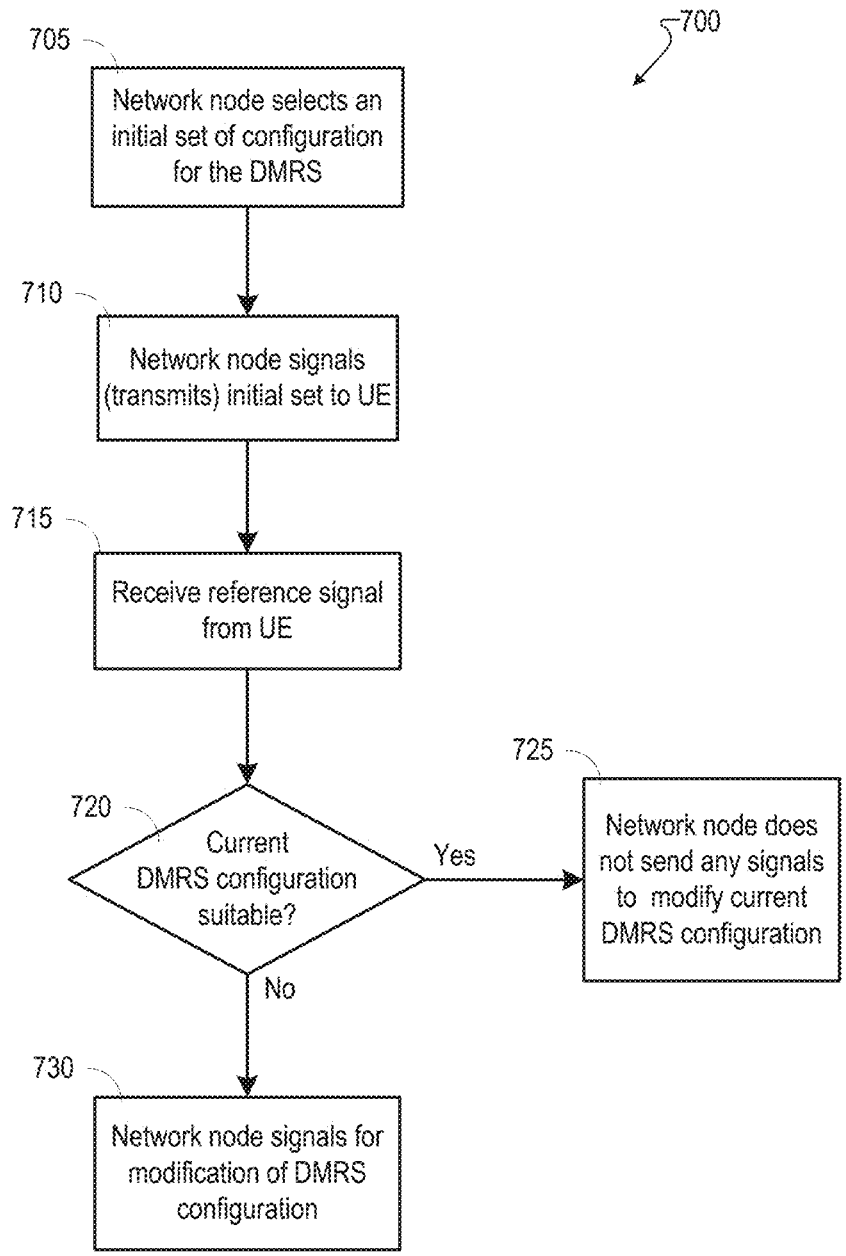
FIG. 7 illustrates a block diagram for modifying a demodulation reference signal (DMRS) configuration, in accordance with various aspects and embodiments of the subject disclosure.

FIG. 7 describes an example method 700 for this technique that can be performed. In example embodiments, the method can be broken down into 3 stages, broadly speaking—initial configuration of the DMRS, detection of condition to modify (e.g., change, correct, adapt, etc.) the DMRS configuration, and signaling for modification of the DMRS configuration, such that the DMRS is adapted for current conditions experienced by the UE.

Referring to FIG. 7, with respect to initial configuration of the DMRS, at step 705, the network node (e.g., network node 104) selects an initial set of configurations for the DMRS to be used by the UE. At step 710, the network node then signals (e.g., sends, transmits, communicates, etc.) this initial set to the UE (e.g., UE 102). In this context, the configuration of the DMRS includes aspects such as DMRS power boost, DMRS density, amongst other things. This initial configuration can be accomplished (e.g., sent to the UE) using, for example, radio resource control (RRC) signaling for the PUCCH configuration.

After receiving a reference signal (e.g., a sounding reference signal) from the UE (e.g. UE 102) at step 715, the receiver at step 720 evaluates the reference signal received from the UE and determines whether the current DMRS configuration is suitable for the link conditions experienced by the UE. This can be done based on estimates of SINR, error rate, path loss, location of the UE in the cell, etc. and can be left up to the receiver implementation. In response to a determination that the current DMRS configuration is applicable for the conditions, the receiver (e.g., the network node 104) does not send any signals calling for the adaptation of the DMRS configuration (e.g., does nothing related to the modification of the DMRS configuration).

In response to the receiver detecting that a condition has been met (or example, if the SINR is below is a specific threshold, or the error rate is very high over a period of time, etc.) where the current DMRS configuration is not applicable (not appropriate for the conditions), or not suitable for the conditions, then the method proceeds to step 730. At step 730, the receiver can signal to the transmitter (e.g., UE) for modification of the DMRS configuration. This signaling can be done either via layer 3 (L3) signaling (RRC configuration), or layer 1 (L1) signaling (downlink control information/uplink control information DCI/UCI, wherein DCI relates to any information transmitted on the physical downlink control channel (PDCCH), and UCI relates to any information transmitted on the PUCCH). The choice of whether L3 vs L1 signaling is performed might depend on which aspect of the DMRS configuration is being modified. For example, if modification of the DMRS density is desired, L3 signaling might be more suitable, whereas signaling a modification to power boosting/scaling can be done via L1 signaling. The network node can, for example, have a table that indicates which configuration to select based on which conditions. In other example embodiments, the network node can modify the DMRS configuration, and if a modification was made, can be sent to the UE (e.g., as part of RRC signaling). The transmitter (e.g., UE) can then, based on the signaling to modify, adapt the DMRS configuration.

Figure 8:
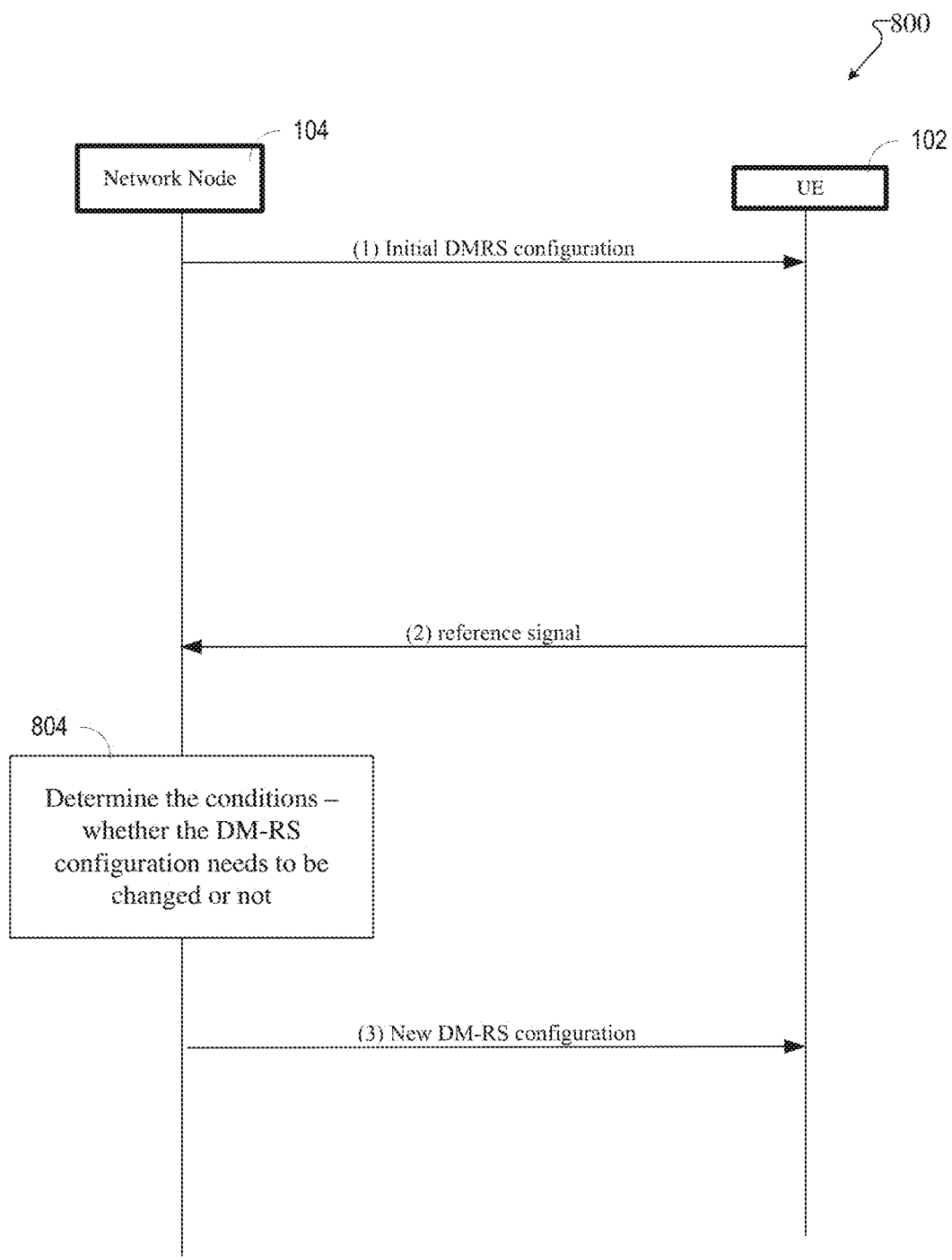
FIG. 8 illustrates a transaction diagram comprising message sequences for modifying a DMRS configuration, in accordance with various aspects and embodiments of the subject disclosure.

FIG. 8 is a transaction diagram showing an example with message sequences related to the signaling of the DMRS configuration modification. At transaction (1), after the network node (e.g., network node 104) selects an initial set of configurations for the DMRS to be used by the UE, the network node signals (e.g., sends, transmits, communicates, etc.) the initial DMRS configuration to the UE (e.g., UE 102). In this context, the configuration of the DMRS includes aspects such as DMRS power boost, DMRS density, amongst other things. This initial configuration can be accomplished (e.g., sent to the UE) using, for example, radio resource control (RRC) signaling for the PUCCH configuration.

After receiving a reference signal (e.g., a sounding reference signal) from the UE (e.g. UE 102) sent in transaction (2), the network node (e.g., the receiver of the network node) can at stage 804 determine whether the current DMRS configuration is suitable for the link conditions experienced by the UE. This can be done based on estimates of SINR, error rate, path loss, location of the UE in the cell, etc. and can be left up to the receiver implementation. In response to a determination that the current DMRS configuration is applicable for the conditions, the receiver does not send any signals calling for the adaptation of the DMRS configuration (e.g., does nothing related to the modification of the DMRS configuration). In response to the receiver detects a condition has been met where the current DMRS configuration is not applicable (for example, if the SINR is below is a specific threshold, or the error rate is very high over a period of time, etc.), then the receiver (e.g., network node) can signal to the transmitter (e.g., the UE) of the network node for modification of the DMRS configuration. This signaling can be done either via layer 3 (L3) signaling (RRC configuration), or layer 1 (L1) signaling (downlink control information/uplink control information DCI/UCI). The choice of whether L3 vs L1 signaling is performed might depend on which aspect of the DMRS configuration is being modified. For example, if modification of the DMRS density is desired, L3 signaling might be more suitable, whereas signaling a modification to power boosting/scaling can be done via L1 signaling.

Still referring to FIG. 8, at transaction (3) a message comprising the modified DMRS configuration, if a modification was needed, can be sent to the UE. In other example embodiments, the network node can signal the UE to modify its DMRS configuration.

Figure 9:
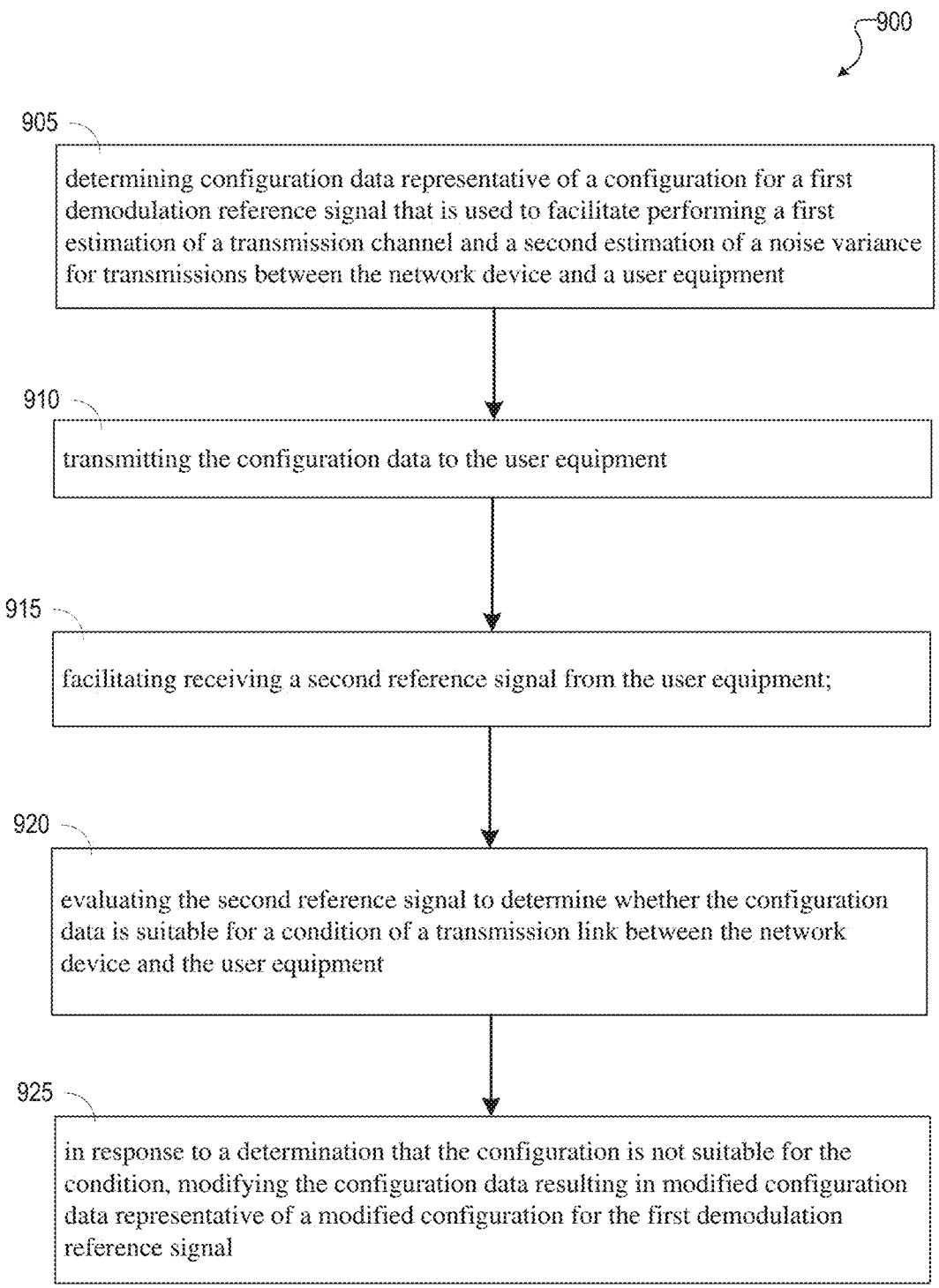
FIGS. 9-11 show example flow charts describing operations that can be performed, in accordance with various aspects and embodiments of the subject disclosure.
Figure 10:
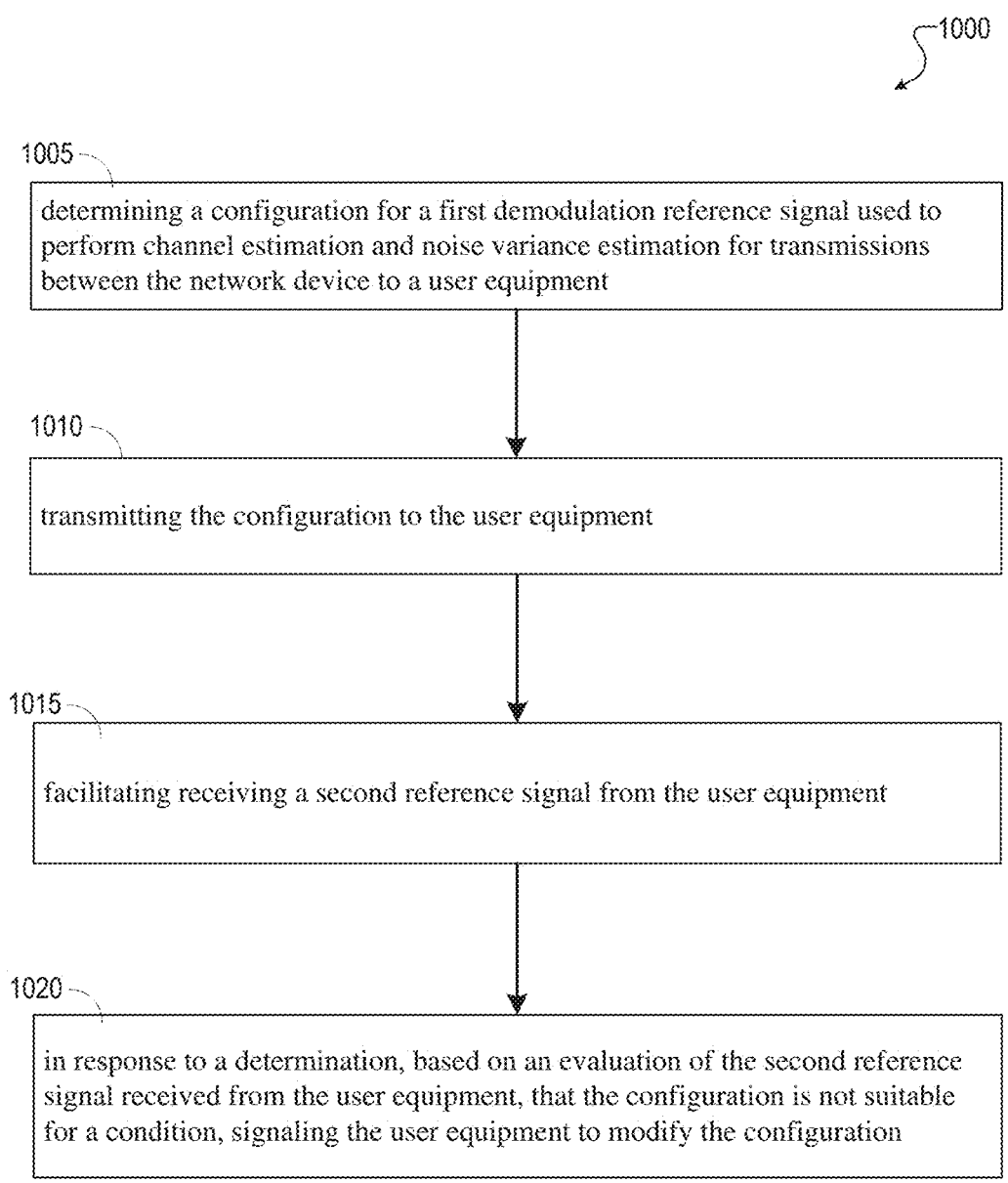
Figure 11:
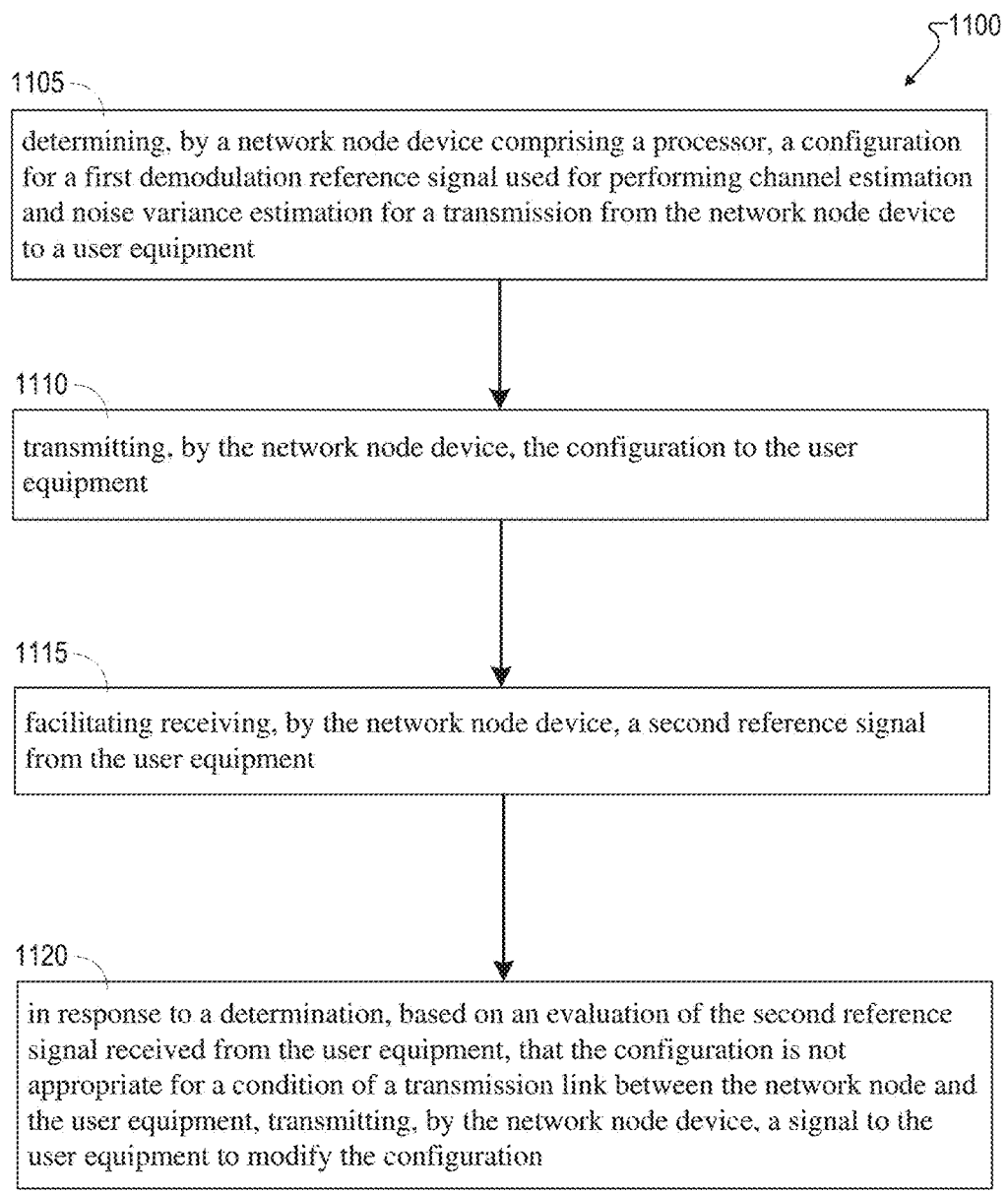

In accordance with some example embodiments, a computing device (e.g., network node 104) can be operable to perform example methods and operations, as illustrated in flow diagrams as shown in FIGS. 9-11 and described in the corresponding text, in accordance with various aspects and embodiments of the subject disclosure. Additionally, machine-readable storage medium, comprising executable instructions that, when executed by a processor, can also facilitate performance of the methods and operations described in FIGS. 9-11.

In non-limiting embodiments (also referred to as example embodiments), a network device (e.g., network node 104), comprising a processor and a memory that stores executable instructions that, when executed by the processor, facilitate performance of example operations 900, as shown in FIG. 9. The network device can comprise antennas, and be operable to use the antennas to communicate via a massive multiple in multiple out protocol.

The operations can comprise, at step 905, determining configuration data representative of a configuration for a first demodulation reference signal (e.g., DMRS) that is used to facilitate performing a first estimation of a transmission channel and a second estimation of a noise variance for transmissions between the network device (e.g., network node 104, receiver, uplink receiver) and a user equipment (e.g., UE 102, transmitter). The configuration data can be, for example, an initial set of configurations for the DMRS.

At step 910, the operations can further comprise transmitting the configuration data to the user equipment.

At step 915, the operations can further comprise facilitating receiving a second reference signal from the user equipment.

The operations can further comprise, at step 920, evaluating the second reference signal to determine whether the configuration data is suitable for a condition of a transmission link between the network device and the user equipment.

The operations at step 925, further comprise, in response to a determination that the configuration is not suitable for the condition, modifying the configuration data resulting in modified configuration data representative of a modified configuration for the first demodulation reference signal. The determination can be based on estimates of a signal-to-noise-plus-interference ratio indicative of a propagation loss for information transmitted on the transmission link. The determination can also be based on an error rate related to errors in transmission experienced by the transmission link.

The operations can also comprise, in some example embodiments, transmitting the modified configuration data to the user equipment. In some example embodiments, the transmissions can be made using a layer 3 protocol related to radio resource control signaling. In some example embodiments, the transmissions can be made a layer 1 protocol related to information communicated via a physical control channel.

In some example embodiments, the network device can comprise a remote radio unit device, wherein the remote radio unit device (e.g., RRU 202) is coupled to baseband unit device (e.g., BBU 204). The RRU can be coupled to the BBU by, for example, a fiber link. If the network device can be thought of as comprising both the RRU and the BBU, then the network device can also be referred to as a system.

Moving to FIG. 10, in non-limiting embodiments (also referred to as example embodiments), a network device (e.g., network node 104), comprising a processor and a memory that stores executable instructions that, when executed by the processor, facilitate performance of example operations 1000, as shown in FIG. 10.

The operations can comprise, at step 1005, determining a configuration for a first demodulation reference signal (e.g., DMRS) used to perform channel estimation and noise variance estimation for transmissions between the network device (e.g., UE 102, receiver, UL receiver) to a user equipment (e.g., UE 102, transmitter).

The operations 1000 at step 1010 can further comprise transmitting the configuration to the user equipment.

The operations 1000 at step 1015 can further comprise facilitating receiving a second reference signal from the user equipment.

The operations 1000 can further comprise at step 1020, in response to a determination, based on an evaluation of the second reference signal received from the user equipment, that the configuration is not suitable for a condition, signaling the user equipment to modify the configuration.

In some example embodiments, the network device can comprise a remote radio unit device (e.g., RRU 202). In some example embodiments, the remote radio unit device can be coupled to (e.g., connected to, communicatively connected to, communicatively coupled to, etc.) a baseband unit device (e.g., BBU 204). The RRU can be coupled to the BBU by, for example, a fiber link.

In example embodiments, the determination can be based on estimates of a signal-to-noise-plus-interference ratio (e.g., SINR). The SINR can be indicative of a propagation loss for information transmitted on the transmission link. The determination can also be based on an error rate. The error rate can be related to errors in transmission experienced by the transmission link. The network device can further comprise antennas, and the network device can be operable to use the antennas to communicate via a massive multiple in multiple out protocol (e.g., massive MIMO).

Now referring to FIG. 11, in non-limiting embodiments, a method 1100 can be performed by the network node device (e.g., network node 104). The method 1100 can begin at step 1105, wherein the method can comprise determining, by a network node device (e.g., network node 104, receiver, UL receiver) comprising a processor, a configuration for a first demodulation reference signal used for performing channel estimation and noise variance estimation for a transmission from the network node device to a user equipment (e.g., UE 102, transmitter).

The method 1100 can further comprise at step 1110, transmitting, by the network node device, the configuration to the user equipment.

At step 1115, the method can further comprise facilitating receiving, by the network node device, a second reference signal from the user equipment.

The method 1100 can further comprise, at 1120, in response to a determination, based on an evaluation of the second reference signal received from the user equipment, that the configuration is not appropriate for a condition of a transmission link between the network node and the user equipment, transmitting, by the network node device, a signal to the user equipment to modify the configuration.

In example embodiments, the configuration (e.g., DMRS configuration) relates to a density representative of an amount of a physical upstream control channel occupied by demodulation reference signal information, and can also relate to an amount of transmit power used by the user equipment. The network node device (which can also be referred to as a system) can comprise a remote radio unit device (e.g., RRU 202), and a baseband unit device (e.g., BBU 204) connected to the remote radio unit device.

Figure 12:
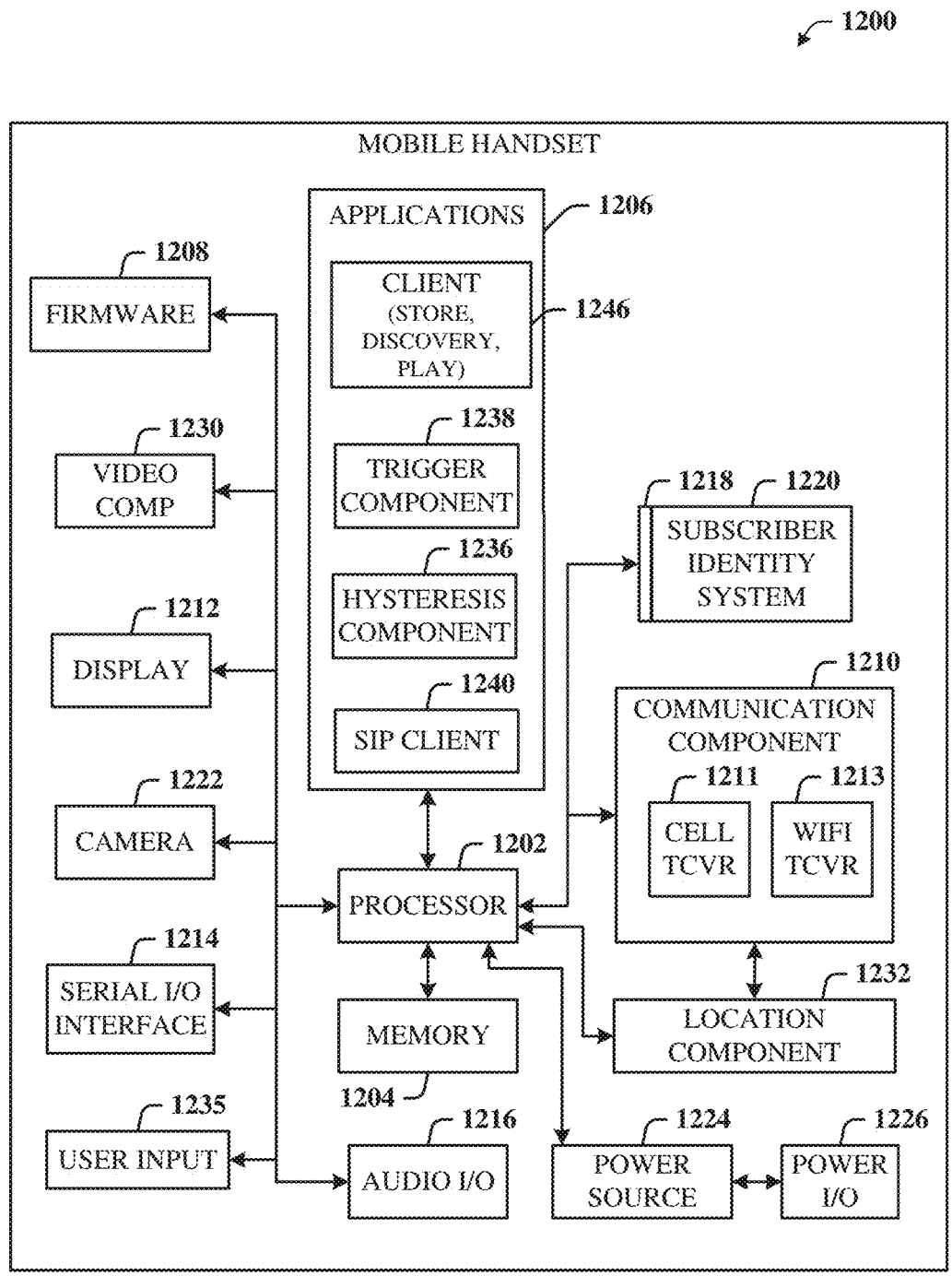
FIG. 12 illustrates an example block diagram of an example mobile handset, which can be a UE, in accordance with various aspects and embodiments of the subject disclosure.

Referring now to FIG. 12, illustrated is a schematic block diagram of a user equipment (e.g., UE 102, etc.) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor

1202 to facilitate wired/wireless communication with external systems, e.g., cellular networks, VoIP networks, and so on. Here, the communications component 1210 can also include a suitable cellular transceiver 1211 (e.g., a global GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A session enable protocol (SIP) client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the handset 1200. The handset 1200 can accommodate at least satellite radio services through a handset that can combine wireless voice and digital radio chipsets into a single handheld device.

Referring now to FIG. 17, there is illustrated a block diagram of a computer 1700 operable to execute the functions and operations performed in the described example embodiments. For example, a network node (e.g., network node 104) may contain components as described in FIG. 17. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 13:
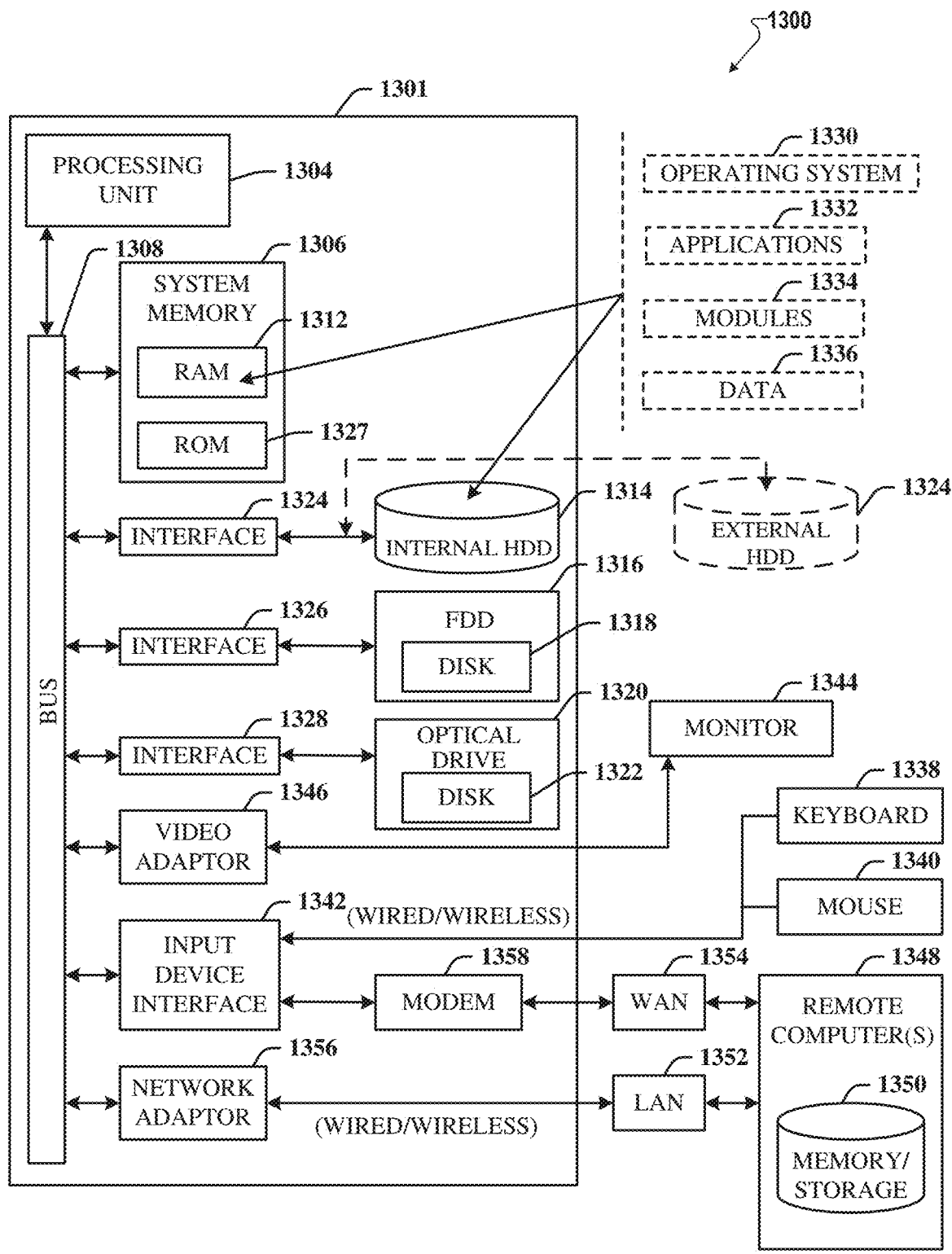
FIG. 13 illustrates an example block diagram of a computer, which can be a network node, that can be operable to execute processes and methods, in accordance with various aspects and embodiments of the subject disclosure.

With reference to FIG. 13, implementing various aspects described herein with regards to devices (e.g., network node 104) can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   determining, by network equipment comprising a processor, configuration data representative of a configuration for a demodulation reference signal,
   wherein the configuration relates to at least one of:
      an amount of transmit power used by a user equipment, or
      an amount of a physical upstream control channel occupied by demodulation reference signal information;
   facilitating, by the network equipment, transmitting the configuration data to the user equipment;
   facilitating, by the network equipment, receiving a reference signal from the user equipment;
   modifying, by the network equipment, the configuration data based on an evaluation of the reference signal from the user equipment, resulting in modified configuration data representative of a modified configuration for the demodulation reference signal; and
   facilitating, by the network equipment, transmitting the modified configuration data to the user equipment.

2. The method of claim 1, wherein the demodulation reference signal is used to facilitate estimation of a noise variance for transmissions between the network equipment and the user equipment.

3. The method of claim 1, wherein the evaluation of the reference signal from the user equipment comprises determining, by the network equipment, whether the configuration data is applicable to a condition of a transmission link between the network equipment and the user equipment.

4. The method of claim 3, wherein modifying the configuration data and facilitating the transmitting of the modified configuration data to the user equipment is in response to a determination that the configuration is not applicable to the condition.

5. The method of claim 1, wherein the configuration relates to the amount of transmit power used by user equipment, and wherein facilitating the transmitting of the modified configuration data comprises using a layer 1 protocol.

6. The method of claim 1, wherein the configuration relates to the amount of the physical upstream control channel occupied by demodulation reference signal information, and wherein facilitating the transmitting of the modified configuration data comprises using a layer 3 protocol.

7. The method of claim 1, wherein the network equipment comprises baseband unit equipment.

8. The method of claim 7, wherein the baseband unit device is coupled to remote radio unit equipment, and wherein facilitating the transmitting of the modified configuration data comprises facilitating sending the modified configuration data via the remote radio unit equipment.

9. The method of claim 8, wherein the remote radio unit equipment is operable to use antennas to communicate via a massive multiple in multiple out protocol.

10. The method of claim 1, wherein the evaluation of the reference signal from the user equipment comprises an evaluation of a signal-to-noise-plus-interference ratio on a transmission link between the network equipment and the user equipment.

11. The method of claim 1, wherein the evaluation of the reference signal from the user equipment comprises an evaluation of an error rate on a transmission link between the network equipment and the user equipment.

12. Network equipment, comprising:
   a processor; and
   a memory that stores executable instructions that, when executed by the processor, facilitate performance of operations, comprising:
      determining configuration data representative of a configuration for a demodulation reference signal,
      wherein the configuration relates to a density representative of an amount of a physical upstream control channel occupied by demodulation reference signal information;
      transmitting the configuration data to a user equipment;
      receiving a reference signal from the user equipment;
      modifying the configuration data based on an evaluation of the reference signal from the user equipment, resulting in modified configuration data representative of a modified configuration for the demodulation reference signal, wherein the modified configuration relates to the density representative of the amount of the physical upstream control channel occupied by demodulation reference signal information; and
      transmitting the modified configuration data to the user equipment.

13. The network equipment of claim 12, wherein the configuration and the modified configuration further relate to an amount of transmit power used by the user equipment.

14. The network equipment of claim 12, wherein the network equipment comprises a baseband unit device.

15. The network equipment of claim 14, wherein the baseband unit device is coupled to a remote radio unit device.

16. The network equipment of claim 12, wherein the evaluation of the reference signal from the user equipment comprises an evaluation of at least one of:
   a signal-to-noise-plus-interference ratio on a transmission link between the network equipment and the user equipment, or
   an error rate on the transmission link between the network equipment and the user equipment.

17. A non-transitory machine-readable medium, comprising executable instructions that, when executed by a processor of a network node device, facilitate performance of operations, comprising:
   determining configuration data representative of a configuration for a demodulation reference signal,
   wherein the configuration relates to a transmit power used by user equipment;
   transmitting the configuration data to a user equipment;
   receiving a reference signal from the user equipment;
   modifying the configuration data based on an evaluation of the reference signal from the user equipment, resulting in modified configuration data representative of a modified configuration for the demodulation reference signal, wherein the modified configuration relates to the transmit power used by the user equipment; and transmitting the modified configuration data to the user equipment.

18. The non-transitory machine-readable medium of claim 17, wherein the configuration and the modified configuration further relate to a physical upstream control channel occupied by demodulation reference signal information.

19. The non-transitory machine-readable medium of claim 17, wherein the evaluation of the reference signal from the user equipment comprises an evaluation of at least one of:
- a signal-to-noise-plus-interference ratio on a transmission link between a network device and the user equipment, or
- an error rate on the transmission link between the network device and the user equipment.

20. The non-transitory machine-readable medium of claim 17, wherein the demodulation reference signal is used to facilitate estimation of a noise variance for transmissions between a network device and the user equipment.

* * * * *